United States Patent [19]

Hinsberg, III et al.

[11] Patent Number: 5,446,870

[45] Date of Patent: Aug. 29, 1995

[54] SPATIALLY RESOLVED STOCHASTIC SIMULATION SYSTEM

[75] Inventors: William D. Hinsberg, III; Frances A. Houle, both of Fremont, Calif.

[73] Assignee: International Business Machines Corporation, Armonk, N.Y.

[21] Appl. No.: 317,421

[22] Filed: Oct. 3, 1994

Related U.S. Application Data

[63] Continuation of Ser. No. 874,475, Apr. 23, 1992, abandoned.

[51] Int. Cl.[6] ............................................. G06F 15/20
[52] U.S. Cl. ..................................... 395/500; 364/578
[58] Field of Search ................ 395/500; 364/578, 499, 364/500

[56] References Cited

U.S. PATENT DOCUMENTS

| | | | |
|---|---|---|---|
| 3,702,009 | 10/1972 | Baldwin, Jr. | 441/1 |
| 4,751,637 | 6/1988 | Catlin | 395/500 |
| 4,758,533 | 7/1988 | Magee et al. | 437/173 |
| 4,819,161 | 4/1989 | Konno et al. | 364/300 |
| 4,828,224 | 5/1989 | Crabb et al. | 251/298 |
| 4,841,479 | 6/1989 | Tsuji et al. | 364/900 |
| 4,935,882 | 6/1990 | Pennebaker et al. | 364/554 |
| 5,202,843 | 4/1993 | Kunimine et al. | 364/578 |

OTHER PUBLICATIONS

Frankowicz, M., "Stochastic Evolution of Inhomogeneous Chemical Systems", 1987 pp. 431–435.

Frankowicz and Gudowska-Nowak, "Stochastic Simulation of a Bistable Chemical System, The Two Box Model," 13 Apr. 1982, pp. 331–344, Physica A.

Kitamura et al, "Stochastic Modeling of Crack Initiation and Short-Crack Growth Under Creep and Creep-Fatigue Conditions," 1992, J. Appl. Mech.

Gillespie, "A General Method for Numerically Simulating the Stochastic Time Evolution of Coupled Chemical Reactions", Journal of Computational Physics, vol. 22, No. 4, pp. 403–434 (1976).

P. Hanusse and A. Blanche, A Monte Carlo Method for large Reaction-Diffusion Systems, J. Chem. Phys. 74(11), 1 Jun. 1981, pp. 6148–6153.

Buncker et al., "Discrete Simulation Methods in Combustion Kinetics", Combustion and Flame, vol. 23, pp. 373–379, 1974.

Buncker et al., User's Man. MSIM4—Discrete Simulator for Kinetic Mechanisms, Univ. of Calif. Irvine, Jul. 12, 1974.

(List continued on next page.)

*Primary Examiner*—Parshotam S. Lall
*Assistant Examiner*—Viet Vu
*Attorney, Agent, or Firm*—Philip R. Wadsworth; James C. Pinter

[57] ABSTRACT

The present invention comprises a simulator including at least one data storage apparatus and at least one processor. The simulator further has a material property data group, a system state data group comprising geometrical data for defining a plurality of geometrical subvolumes and system condition data for each subvolume of a simulated system, an event probability data group including a plurality of event subgroups for uniquely identifying a set of events, event probabilities being associated with at least one of the geometrical subvolumes, and an event process data group including the time dependent process functions for all events which can occur in the system. These data groups and at least one functional-relationship link for correlating all of them are stored in the data storage apparatus. Thus, the material energy system can be represented by such data groups without requiring an explicit multiple dimension data structure. The processor performs a simulating process comprising the steps of: (a) computing the probability of occurrence for each of the events and determining a time step by using a total probability of occurrence for each of the events; (b) randomly selecting a simulated event for the time step and updating the system condition data group representing the system state; and (c) repeating the steps (a) and (b) until a predefined simulation end time is reached.

1 Claim, 12 Drawing Sheets

OTHER PUBLICATIONS

Hinsberg et al., IBM Res. Rept. RJ 7814 (72196) Nov. 08, 1990, "MSIMPC v2.0: An Interactive Discrete Chemical Mech. Simulator for the IBM/PC" (Lab & Classroom Version).

Turner, "Discrete Simulation Methods for Chemical Kinetics", Journal of Physical Chemistry, vol. 81, No. 25 pp. 2379–2408 (1978).

Hicks et al., "Can Pulse Laser Excitation of Surface be Described by a Thermal Model?", Physical Review Letters, vol. 61, No. 22, pp. 2588–2591 (1988).

Liarokapis et al., "Temperature Rise Induced by a cw Laser Beam Revisted", Journal of Applied Physics, vol. 57, No. 12, pp. 5123–5126 (1985).

Mihram, "Simulation: Statistic Foundations and Methodology", Academic Press, NY, pp. 229–231 (1972).

Bianchi et al., "Stochastic Simulation: a Package for Monte Carlo Experiments on Econometirc Models", IBM Tech. Disclosure Bulletin vol. 20, No. 10, pp. 3792–3795 (1978).

Gillespie, "Exact Stachastic Simulation of Coupled Chemical Reactions", Jour. Phys Chem, vol. 81, 2340, pp. 2340–2361, 1977.

Barbero et al., "Stochastic Simulation Methods for Pollution Kinetics", Anales de Quimica, pp. 397–403 (1984).

H. P. Breuer et al., "A Stochastic Approach to Complex Chemical Reactions", Chem. Phys. Letters., vol. 190, No. 3,4, pp. 199–201, Mar. 6, 1992.

O SPECIES A
• SPECIES B
✱ SPECIES C
△ SPECIES D

Event Selection for Homogeneous Chemical Reaction

| Reaction step | Rate |
|---|---|
| 1. $A \rightarrow B+C$ | $R_1 = k_1 A$ |
| 2. $B+2C \rightarrow A+C$ | $R_2 = k_2 BC^2$ |
| 3. $A+C \rightarrow D$ | $R_3 = k_3 AC$ |

Rate = Probability, $sec^{-1}$
$R_1 = P_1$
$R_2 = P_2$
$R_3 = P_3$
Total Probability, P, $sec^{-1}$
$P = P_1 + P_2 + P_3$
Time step, t, sec
$t = 1/P$
New time = Old time + t Select Event in Simulation of Chemical Reaction, Mass Transfer, and Heat Flow in Cube (3x3x3 cube, 3 reaction steps)

Probability Arrays

1. Chemical: $R_{1,111}, ..., R_{2,111}, ..., R_{3,111}, ...$ (81 elements)
2. Mass Transfer, Species A, Z Direction: $TAZ_{111 \Leftrightarrow 112}, ...$ (18 elements)
3. Mass Transfer, Species B, Z Direction: $TBZ_{111 \Leftrightarrow 112}, ...$ (18 elements)
4. Mass Transfer, Species C, Z Direction: $TCZ_{111 \Leftrightarrow 112}, ...$ (18 elements)
5. Mass Transfer, Species D, Z Direction: $TDZ_{111 \Leftrightarrow 112}, ...$ (18 elements)
6. Mass Transfer, Species A, X Direction: $TAX_{111 \Leftrightarrow 211}, ...$ (18 elements)
7. Mass Transfer, Species B, X Direction: $TBX_{111 \Leftrightarrow 211}, ...$ (18 elements)
8. Mass Transfer, Species C, X Direction: $TCX_{111 \Leftrightarrow 211}, ...$ (18 elements)
9. Mass Transfer, Species D, X Direction: $TDX_{111 \Leftrightarrow 211}, ...$ (18 elements)
10. Mass Transfer, Species A, Y Direction: $TAY_{111 \Leftrightarrow 121}, ...$ (18 elements)
11. Mass Transfer, Species B, Y Direction: $TBY_{111 \Leftrightarrow 121}, ...$ (18 elements)
12. Mass Transfer, Species C, Y Direction: $TCY_{111 \Leftrightarrow 121}, ...$ (18 elements)
13. Mass Transfer, Species D, Y Direction: $TDY_{111 \Leftrightarrow 121}, ...$ (18 elements)
14. Heat Transfer, Z Direction: $HZ_{111 \Leftrightarrow 112}, ...$ (18 elements)
15. Heat Transfer, X Direction: $HX_{111 \Leftrightarrow 211}, ...$ (18 elements)
16. Heat Transfer, Y Direction: $HY_{111 \Leftrightarrow 121}, ...$ (18 elements)

FIG. 6A

Spatial grid for 3-dimensional simulation

Example: Probabilities for xyz ⇔ x'y'z' cell pairs, transfer in z direction

| | |
|---|---|
| $P_1, P_2$ | 111 ⇔ 112 ⇔ 113 |
| $P_3, P_4$ | 121 ⇔ 122 ⇔ 123 |
| $P_5, P_6$ | 131 ⇔ 132 ⇔ 133 |
| $P_7, P_8$ | 211 ⇔ 212 ⇔ 213 |
| $P_9, P_{10}$ | 221 ⇔ 222 ⇔ 223 |
| $P_{11}, P_{12}$ | 231 ⇔ 232 ⇔ 233 |
| $P_{13}, P_{14}$ | 311 ⇔ 312 ⇔ 313 |
| $P_{15}, P_{16}$ | 321 ⇔ 322 ⇔ 323 |
| $P_{17}, P_{18}$ | 331 ⇔ 332 ⇔ 333 |

FOR PROBABILITY $P_n$ TO TRANSFER FROM XYZ → XY (Z+1)
(WITHIN LIMITS OF VOLUME 80)

$$X = [(n-1) \text{ div } 6] + 1$$

$$y = [[(n-1) \text{ div } 2] \text{ mod } 3] + 1$$

$$z = [(n-1) \text{ mod } 2] + 1$$

SPATIALLY RESOLVED STOCHASTIC SIMULATION SYSTEM

This is a continuation application Ser. No. 07/874,475 filed on Apr. 23, 1992 now abandoned.

BACKGROUND OF THE INVENTION

1. Field of the Invention

This invention relates generally to a simulator capable of simulating, predicting, and/or controlling the system performance of a time-progressive material-energy system. More particularly, this invention teaches a stochastic simulator to perform real-time simulation, prediction or control of a spatially inhomogeneous system by fully utilizing the data storage capacity and processing power provided by an on-line computer system.

2. Description Of the Prior Art

The usefulness of a simulator for a highly dynamic and complex system is often limited to design or training but seldom used for real time control. There is an intrinsic limitation, namely, the processing time required to propagate the system by a simulator in many cases is slower than the rate of occurrence of the real events taking place in the simulated system thus preventing the simulators from being used on a real time basis.

The usefulness of a conventional simulator is also limited by the fact that a simulator in most cases is 'system specific', i.e. a simulator is constructed to only simulate a system with certain geometrical configurations, material compositions, physical or chemical processes, and dynamic characteristics with very limited ranges of flexibility. A simulator originally designed to be implemented on a certain combination of hardware and software for simulating a specific system is generally very rigid in its data structures and processes of operations so that the simulator can not easily be converted to either simulate a different system or be implemented on a different combination of hardware and software architectures. With the widespread use of the more intelligent processors and the increased capacity of data storage and computer networks to enhance the speed and performance of distributed parallel and concurrent data processing, rigid data structures and inflexible simulation processes pose a major hindrance preventing the simulator art from taking advantage of the ever increased data processing power and data storage capacity provided by the modern electronic and computer industry.

A simulator for simulating and predicting the state of a time-dependent material-energy system can be a very difficult and time consuming task for several reasons. Traditionally, a mathematical formulation which often involves a set of complicated and dynamically interactive differential equations is used to explicitly represent various space and time-dependent processes which may occur under a variety of system conditions. Explicitly means that all the information predetermined to be necessary to represent the entire system is actively determined for each time step for the simulation. To do this, the simulator performs a process to solve this set of differential equations by using a finite difference or finite element method to obtain the numerical solutions. For complex systems in particular, simulation and prediction inaccuracies may result from either the approximation errors caused by the finite difference or finite element solution methodologies or from the fact the differential equations may not accurately represent the system behavior at all times in all locations over the entire system.

Instead of treating the simulation of a time-dependent material-energy system as a mathematical solution process, stochastic simulators have been developed. These operate by continuously and dynamically tracing a set of individual events which may occur over the time-span of simulation. The simulator makes an assumption that each event has a certain probability of occurrence which is determined by the system conditions and material properties at a specific point of time. In a predefined time-window which is commonly referred to as a time step, any one of the simulated events may occur. There is, on the average, one occurrence of an event within a time step when the length of that time step is selected to be equivalent to the inverse of the total probability of occurrence of all events. The likelihood of occurrence of certain event within that time step is proportional to the probability of occurrence of that individual event. A stochastic simulator commonly comprises at least one processor which is capable of defining a time step and then randomly selecting an event as a triggering-event for that time step. The likelihood of an event being randomly selected is proportional to the probability of occurrence of the selected event relative to that of the other events. As the consequence of the occurrence of the selected event, the processor updates the system conditions by use of material property tables, system process equations and other required data groups stored in at least one data storage apparatus. The processor then selects a new time step and repeats the event selection and system condition update processes to propagate a system through the entire time span for system simulation.

A stochastic simulator was first used to simulate a spatially homogeneous chemical system where many chemical reactions occur (D. L. Bunker et al., Combustion and Flame, Vol. 23, p. 373 ff., 1974). The probability of an individual chemical reaction is dependent on the concentrations of a variety of chemical reactants. The functional dependence and the concentrations are stored in the storage apparatus. The processor generates a random number to select among various chemical reactions a specific reaction in each time step thus allowing the simulation to propagate in time. The time base for determining the length of time step is based on the total sum of all reaction probabilities. Two specific embodiments of this type of simulator are described in documents available from Quantum Chemistry Program Exchange (Indiana University) as Simulator 293 and Simulator QCMP069.

The tasks performed by a simulator according to Bunker et al. are divided into many stages as illustrated in Appendix A where a stochastic simulator is used to simulate a spatially homogeneous chemical reactor 10 (FIG. 1). The chemical reactor 10 may be described as a very small volume containing a limited but adequate number of molecules 12 of the various species involved in a set of chemical reactions. The initial state of this volume, e.g. temperature, pressure and concentrations, is stored in the data storage apparatus of the simulator (see Appendix A, step (b) of stage 1). The intrinsic characteristics of the system, e.g. the allowed reaction pathways and their rate of occurrence (step (a)), are also stored in the storage apparatus of the simulator as a plurality of system process arrays. The processor first computes the initial probabilities from the initial state and the system process arrays. The processor then propagates the simulation by stochastically selecting one event at a time and iteratively executing the sequence of steps listed in stage 3. The simulator then generates a data group for storage in the data storage apparatus in stage 4 representing the state of the chemical reactor at each time step when the processor completes the simulation steps listed in stage 3.

FIGS. 2A, 2B and 2C schematically illustrate the event selection operation used by Bunker et al. for simulating the chemical reactor 10 which comprises three chemical reactions, numbered as reactions 1, 2 and 3, the reaction sharing reaction rates of $R_1$, $R_2$ and $R_3$ respectively, defined by rate constants $k_1$, $k_2$ and $k_3$ and the instantaneous concentrations of the species A, B, and C. The rates $R_n$ can be considered to be the probabilities of reactions 1 to 3 occurring per second, and the total probability P (per second) is then the sum $R_1+R_2+R_3$. Since the mean probability of an event occurring in the time period 1/P is unity, that period is taken as the time step for a single event and the elapsed time in the simulation is advanced by that amount (FIG. 2B). The processor uses a random number to select one of the three reactions. Depending on the value of the random number any of the three reactions can be selected (FIG. 2C), with the likelihood for selection of a given reaction equal to its contribution to the total probability P. This is represented by the lengths of the line segments in FIG. 2C.

Another chemical simulator has been developed by Gillespie wherein the simulator generates two random numbers; one for identifying a chemical reaction and another for properly weighting the time base used for time step determination. (Journal of Computational Physics, Vol. 22, No. 4, pp. 403–434, 1976). Better accuracy is achieved because the time step is dynamically weighted by the probability of occurrence for each individual event.

The stochastic simulators disclosed by Bunker and Gillespie are both homogeneous simulators which can only be used to simulate spatially homogeneous systems. Gillespie proposes to generalize the application of these stochastic simulators to spatially inhomogeneous chemical reactions by first dividing the simulated system into a plurality of subvolumes and allowing the chemical reactions to proceed "independently" in several subvolumes. The mass transport of reactants and reaction products between the subvolumes are proposed to be assigned with probabilities in a manner similar to that used for the individual chemical reaction steps. A 3-dimensional probability function has to be used, reflecting both a reaction step and a physical location. The proposed simulator is required to stochastically select a specific subvolume as well as a specific reaction step to propagate the chemical reaction throughout the entire system in time. A simulator as proposed by Gillespie thus would be required to simultaneously process three random selection processes; one for the selection of subvolumes, one for reaction type and one for time step weighting. Since the proposed simulator selects the reaction step independently from the selection of a particular subvolume, the time step obtained after the random time-step weighting process may be constrained by the selected subvolume and therefore may not be appropriate for other subvolumes wherein other reaction steps may have rates of reactions significantly different than that of the selected volume.

The proposed simulator would thus have difficulties in determining a common time base for defining a time step for the entire system. Recognizing this limitation, Gillespie states that application of the proposed simulator to inhomogeneous chemical systems is limited to tubular systems with very similar subvolumes where differences in time evolution of the various subvolumes would be small.

Various discrete simulation technologies for chemical kinetics are reviewed by J. Turner, Journal of Physical Chemistry, Vol. 81, No. 25, pp. 2379–2408, 1978). Turner briefly discusses the space-dependent stochastic simulation methods with a specific reference to the simulator proposed by Gillespie and proposes a method which is essentially an extension of a one-dimensional system similar to that of Gillespie. It is obvious to those of ordinary skill in the art that a spatially inhomogeneous stochastic simulator may have broad applications. However, it is well recognized that due to the complexity of the system and the need to simultaneously process random selection of multiple parameters to accurately trace the changes in a dynamic system, a three dimensional spatially inhomogeneous stochastic simulator would be too complicated and too slow to be practically useful.

SUMMARY OF THE PRESENT INVENTION

It is therefore an object of the present invention to provide a stochastic simulation system capable of accurately simulating, predicting or controlling a simulated system which is spatially inhomogeneous.

It is another object of the present invention to provide a spatially inhomogeneous stochastic simulator wherein the simulation and prediction are performed expeditiously whereby the simulator including at least one processor can control the simulated system on a real-time basis.

It is another object of the present invention to provide a stochastic simulation system which is capable of simultaneously simulating a plurality of events occurring in a plurality of spatial cells whereby the simulator can simulate, predict or control the simulated system in a timely synchronized manner.

It is another object of the present invention to provide a stochastic simulation system without requiring the solution of a mathematical algorithm whereby the simulation, prediction or control of the simulated system can be expeditiously performed while maintaining a high level of simulation accuracy.

It is another object of the present invention to provide a generalized stochastic simulation system which can be easily configured for application to systems with a wide variety of geometries, reaction events and material properties without requiring detailed and elaborate pre-simulation analyses. The present invention comprises a simulator system for simulating and/or controlling a time-progressive material-energy system which comprises at least one data storage apparatus including a data correlating means. A plurality of data groups stored in said data storage apparatus include a plurality of data for defining geometric configuration, system state, material properties, material-energy processes and probabilities of occurrence of the material-energy processes. These data groups may take the form of an array, a linked list, a lookup table or other types of data structures. The data correlating means is capable of defining at least one functional-relationship link for correlating all of the data groups whereby the material-energy system can be represented by the data groups without requiring an explicit multiple dimension data structure.

The simulator further comprises at least one processor including a data input means for receiving data of the data groups from the data storage apparatus. The processor further has means for performing a simulating process utilizing the functional-relationship link among a plurality of said data groups by executing the steps of: (a) computing an event probability for each of the possible material-energy processes and determining a time step by using a total probability of occurrence by summing up all of said material-energy probabilities; (b) randomly selecting a material-energy process event for the time step and using the material-energy processes, the material property data and the geometric configuration data for updating the system state data resulting from the occurrence of the selected material-energy process; (c) repeating said steps (a) and (b) until a predefined simulation end time is reached. The processor further has a control means capable of utilizing the updated system state as obtained from the simulating process in step (b) for controlling the time-progressive material-energy system.

It is an advantage of the present invention that it provides a stochastic simulation system capable of accurately simulating, predicting or controlling a simulated system which is spatially inhomogeneous.

It is another advantage of the present invention that it provides a spatially inhomogeneous stochastic simulator wherein the simulation and prediction are performed expeditiously whereby the simulator comprising at least one processor can control the simulated system on a real-time basis.

It is another advantage of the present invention that it provides a stochastic simulation system which is capable of simultaneously simulating a plurality of events occurring in a plurality of spatial cells whereby the simulator can simulate, predict or control the simulated system in a timely synchronized manner.

It is another advantage of the present invention that it provides a stochastic simulation system without requiring the solution of a mathematical algorithm whereby the simulation, prediction or control of the simulated system can be expeditiously performed while maintaining a high level of simulation accuracy.

It is another advantage of the present invention that it provides a generalized stochastic simulation system which can be easily configured for application to systems with a wide variety of geometries, reaction events and material properties without requiring detailed and elaborate pre-simulation analyses.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIG. 2C illustrates event selection using a random number;

FIG. 6A lists the probability arrays established in the simulator according to the invention;

DETAILED DESCRIPTION OF THE PREFERRED EMBODIMENT

Figure 3A:
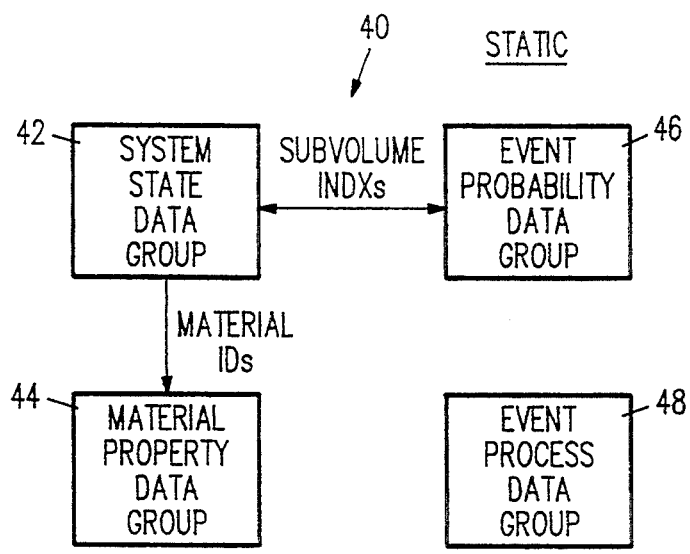
FIGS. 3A and 3B illustrate the data structure including four data groups wherein a subvolume index (INDX) and a material property identification (ID) provide a link between these data groups.
Figure 4:
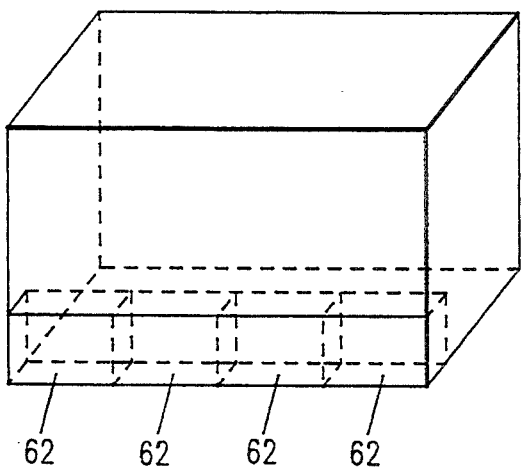
FIG. 4 shows a three dimensional material energy system comprising many subvolumes.

FIG. 3A shows a data structure 40 comprising four data groups. Namely, a system state data group 42, a material property data group 44, an event probability group 46 and an event process data group 48. The system state data group 42 first defines a plurality of subvolumes 62 (FIG. 4) each having a subvolume index (INDX). These subvolumes represent the geometrical configuration of a material-energy system as shown by FIG. 4 where a material-energy system 60 includes a plurality of subvolumes 62. The system state data group 42 further provides information of the system condition in each of the subvolumes 62 identified by the associated subvolume index (INDX).

Each of the subvolumes 62 as defined by the corresponding subvolume INDX also contains a plurality of materials. The properties of each material are identified by material property identifications (ID). Referring back to FIG. 3A, the material property data group 44 includes a plurality of data subgroups. Each subgroup defines the material properties identified by a material property ID contained in at least one of the subvolumes 62 identified by the associated subvolume INDX. The event probability data group 46 includes a plurality of event numbers for uniquely identifying a set of events each associated with at least one subvolume 62 identified by the subvolume INDX and each having an event probability depending on the system condition and the material properties in the associated subvolumes 62. The event process data group 48 includes a plurality of process functions for determining the event probabilities from the system conditions as provided by the system state data group 42 in each of the subvolumes identified by an associated subvolume INDX, and by the material property data group 44.

Specifically, each of these data groups in a preferred embodiment is described as follows:

1. The system state data group 42 first defines a plurality of subvolumes which represent the geometrical information about the scale of the simulation. Each subvolume is assumed to be homogeneous and is provided with information concerning the numbers of simulation particles it contains (apportioned appropriately among chemical species and energy as required by the simulation parameters), its temperature (and pressure, if appropriate), its size and shape, and its location in the material energy system 60. It is also tagged with one or more material IDs describing its composition and properties via a link to the material property data group 44 as described further below. The overall structure of the subvolumes can be static (determined at the beginning of the simulation process and then left unchanged) or dynamic (certain regions of subvolumes are allowed to vary with time). An example of a simulation where dynamic subvolumes would be desirable is in simulation of chemical vapor deposition of thin films. The subvolumes can be regular or irregular in size, with the only constraint that there can be no boundary mismatch between two adjacent subvolumes. The subvolumes can be monolithic, or separated into distinct areas for convenience. For example, two subvolumes moving relative to each other can be used to simulate the effects of tribological interactions. As another example, in the laser heating embodiment (FIGS. 9 and 10) the subvolumes can be conveniently separated into layers of different materials. Further, one or more individual layers can be configured to be patterned or composite layers by assigning different materials ID's to individual subvolumes in those layers.

2. The materials property data group 44 contains basic physical and chemical information describing the materials and chemical species present in the system 60. These can be organized as convenient, with each grouping identified by an appropriate ID tag used for linking to the subvolumes and the event probability data group 46. Information which may be specified includes molar concentrations, heat capacity, thermal conductivities, optical properties, densities, susceptibilities, emissivities, compressibilities, permeabilities and so on. Geometrical information about energy and matter sources such as a laser beam or a gas jet would also be included. Each may have appropriate dependences on temperature, wavelength of light, time, pressure, chemical concentrations, phase of matter, and local electric, magnetic and gravitational fields. When new probabilities are to be updated, the event probability data group 46 is available from the data storage apparatus. A particular feature of this type of data structure is that the computational overhead of including very complex dependences is only slightly larger than including very simple dependences, or assuming that physical properties are constants. This allows realistic tracing of individual events in different subvolumes to be made. The material property data group 44 can be independently generated and stored in the data storage apparatus and available for retrieval during the simulation and/or on-line control processes.

3. The event probability data group 46 comprises subgroups of event probabilities organized according to a predefined order, and includes all events selected for simulation. It is linked to the subvolumes by assigning each subgroup member to a subvolume or a set of subvolumes. Probabilities for each type of process can be listed separately in one or more subgroups. For example, in the laser heating embodiment the probabilities for energy absorption and heat flow are listed in separate arrays. Each subvolume is linked to one or more event probability data group members via its INDX.

For example, in the laser heating embodiment (FIG. 10), subvolumes and probabilities are organized into separate arrays, and INDX is a subvolume-array index. A specific probability array element can be accessed by using an arithmetic expression to calculate the probability array index for that element from INDX. In this manner, a simple connection between probability group member and subvolume or a set of subvolumes undergoing a particular process may be maintained. In other situations other methods of organizing the probabilities and defining INDX may be more useful.

The advantage of providing separate event probability subgroups for each distinct physical process is that it allows the explicit selection of the events to be simulated at the time the data structure 40 is constructed. In this manner a very flexible, general-purpose simulator can be implemented which can be used to produce 3-D simulations of one or many simultaneous events. Because the probability data is linked to the subvolumes 62 identified by the associated subvolume INDXs, and each subvolume 62 is labelled with one or more material property IDs, the probability data group 48 is automatically linked to "libraries" of information concerning event processes and properties of the subvolumes defined by the material property data group 42 which are thus available for probability determination.

Figure 3B:
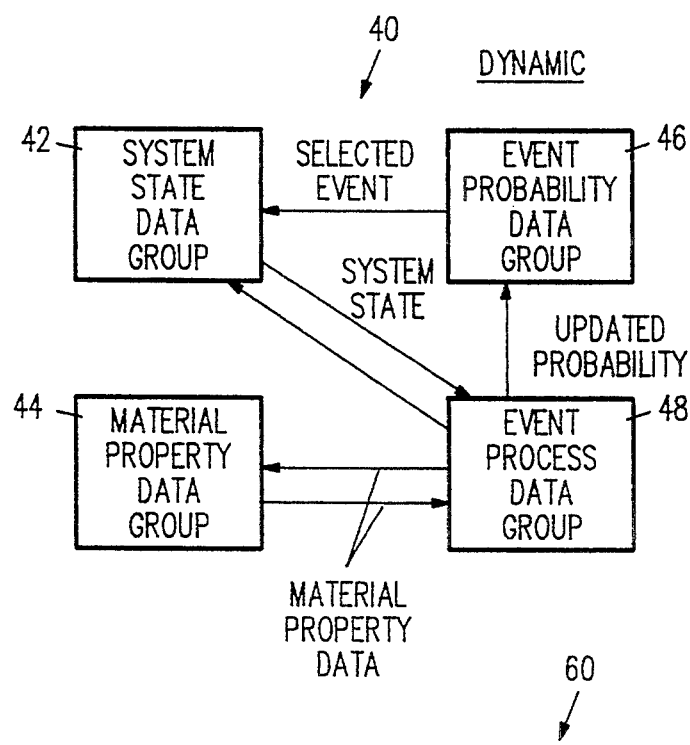

4. The event process data group 48 contains all process functions, which may be a set of mathematical representations or database tables or other kinds of relational definitions for process probability determinations. These process functions may be fixed, e.g. diffusion, or stored separately in a database before the simulation process, e.g. chemical reaction steps and kinetics. Typically these process functions will use various material-specific parameters from the materials properties data group 44 and the system conditions as provided by the system state data group 42. The event process data group may be constructed to simulate one or more of the following processes which may occur in the material-energy system 60:
   a. chemical transformation
   b. heat transfer
   c. mass transfer
      diffusion
      flow
      convection
      movement under an electric field
      movement under a magnetic field
      movement under a gravitational field
      movement under a centrifugal field
   d. absorption, reflection and emission of radiation e. compression by a static or time-varying force (stress or shock)
f. phase transformation
g. radioactive decay, transmutation
h. mechanical and frictional forces The data structure 40 as shown in FIG. 3B therefore has unique functional characteristics which are particularly useful for a spatially inhomogeneous stochastic simulator. Among these data groups, a linking relationship is provided by two common indexing parameters, i.e. the subvolume INDX and the material property ID. By the use of these common indexing parameters, a simulator is provided with information to first determine the types of physical or chemical events that will occur in different subvolumes 62 using event probability data group 46. In response to the occurrence of an event in a subvolume 62 labelled with one or more material IDs, the simulator is also provided with material property data group 44 to update the system condition data group 42 and event probability data group 46 by use of the process functions contained in the event process data group 48.

The data structure 40 thus provides to the simulator sufficient information to trace a three-dimensional time-progressive material energy system without explicitly and simultaneously managing the interactions between the subvolumes. The complexity of a spatially inhomogeneous stochastic simulator is greatly reduced. Specifically, in randomly selecting and tracing an event in each time step for propagating the system, the simulator in the mean time also randomly selects a set of subvolumes 62 implicitly. The effects caused by the spatially inhomogeneous material distributions and system conditions among different subvolumes 62 are accounted for via the link INDX between the event probability data group 46 and the system state data group 42 and the link material ID between the system state data group 42 and the material property data group 44.

In addition to the advantage of reducing the spatial complexity of stochastic simulation, the data structure 40 also provides greater flexibility for the construction of a stochastic simulator. A stochastic simulator generally has a set of core operations which basically includes the steps of 1). random selection of a simulated triggering event and 2). propagating the system with the selected event based on a time step depending on the total probability. With the flexibility provided by the data structure 40, this set of core simulation operations once developed can be applied to simulate a wide variety of systems in a modularized fashion. Simulation of material-energy systems represented by different sets of data groups can be conveniently accomplished by applying this core simulation module to different data structures 40 comprising these different sets of data groups. A more generic simulator is therefore constructed by coupling this core simulation module with the data structure 40 thus enabling the simulator to be easily convertible from one type of software and hardware implementation to another and/or for simulating different material-energy systems.

Figure 5:
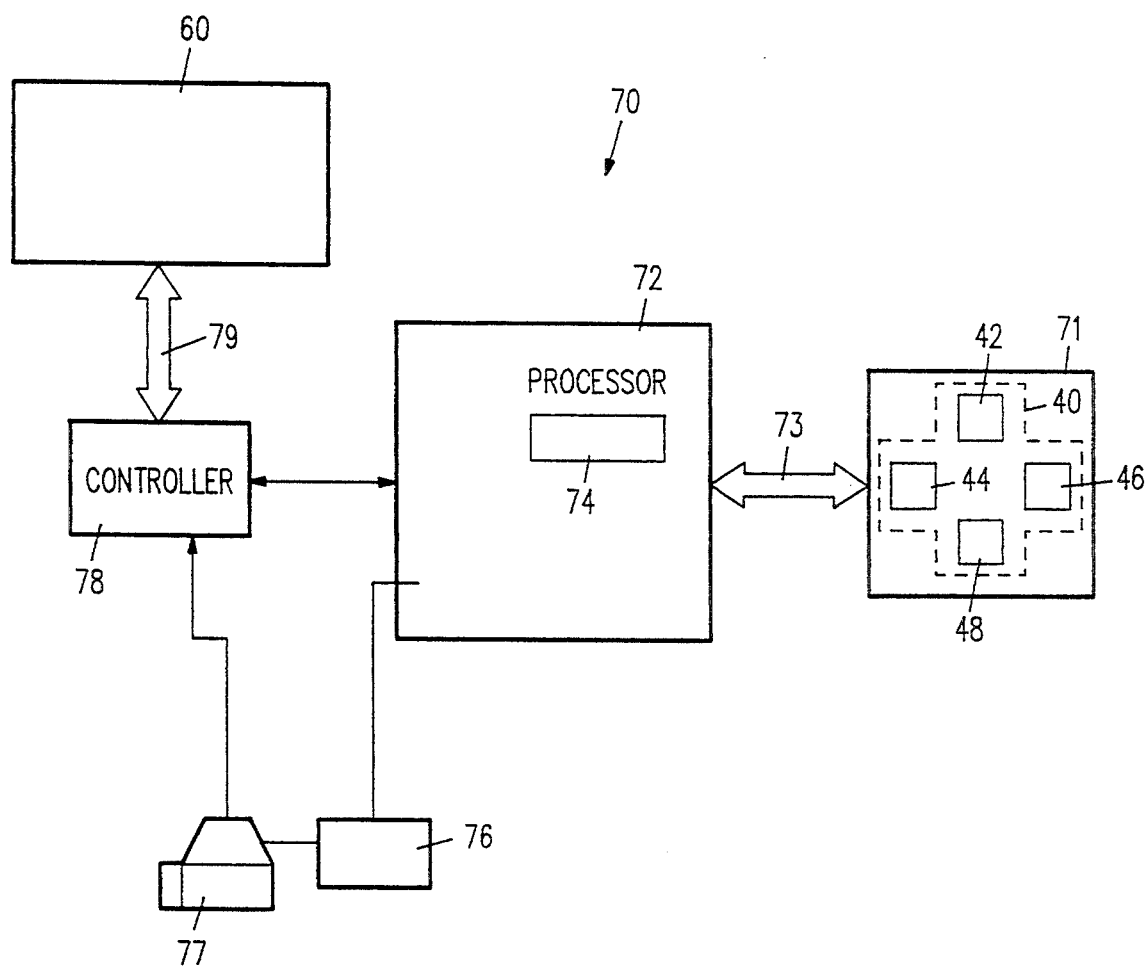
FIG. 5 shows a schematic diagram of a software/hardware on-line control system utilizing a simulator according to the present invention.

FIG. 5 shows the actual implementation of the data structure 40 in a software/hardware system 70. The data structure 40 including the system state data group 42, the material property data group 44, the event probability data group 46 and the event process data group 48 are stored in a data storage apparatus 71. A processor system 72 including a simulating means 74 for simulating a material-energy system 60 is used to perform the steps described in stage 2 and stages 3 of Appendix A which comprise:

1. determining the initial probabilities of all the events defined in the event probability data group 46;
2. determining a time step as a function of the total probability;
3. normalizing the probability; such that the sum of all probabilities is equal to a predefined value;
4. randomly selecting a simulation triggering event;
5. with the occurrence of the selected triggering event, updating the system state data group 42 which may comprise data of material concentrations, temperatures, pressures, etc, using the event process data group 48 and the data provided by the material property group 44, and the existing system condition provided by the system state data group 42;
6. updating the event probability data group 46 by use of the material property data group 44 and the updated system state data group 42; and
7. repeating the above steps 2–6 until the simulation process is completed.

The simulating means 74 implemented on the processor system 72 can either be software or hardware or any combinatorial implementations. The processor system 72 has a data bus 73 linked to the data storage apparatus 71 for receiving and sending data to the data storage apparatus 71. The software/hardware system 70 further has a display apparatus 76 for display, and an user interface system 77 for sending commands to the software/hardware system 70 and a controlling means 78 for controlling the material-energy system 60 which is connected through a data/command connecting line 79 to the controlling means 78. The controlling means 78 further can receive sensor and measurement signals from the system 60 for updating the system state data group 42 stored in the data storage apparatus 71. Through the user interface system 77, an operator of the software/hardware system 70 can provide controlling parameters for the simulating means 74 such as the number of simulation steps, the numbers of particles to represent chemical concentrations and energy and the display interval for the display data which may include spatial distributions of concentrations, temperature or pressure or other system parameters to be sent to the display apparatus.

On-line real time control of the operation of system 60 is achievable by the software/hardware system 70 if the simulating means 74 can propagate the system performance of system 60 faster than the realistic physical propagations of the process events in the system 60. In other words, if the simulating means 74 can complete the simulation and prediction steps within a time span shorter than the time step used for system propagation, then a system operator or the controlling means 78 can use the system performance prediction to control the real time operation of system 60.

The simulation process is further simplified in this invention to achieve higher simulation speed in order to achieve the purpose of a real time on-line control of the material energy system 60 with the software/hardware system 70. Higher speed simulation is achieved by reducing the stochastic selection process to a one-dimensional selection process by taking advantage of the relational-definition provided by the data structure 40 and by arranging the event probability data group 46 in a predefined order.

Instead of randomly selecting a triggering event in each subvolume and tracing these randomly selected events simultaneously in a spatially inhomogeneous system as proposed by Gillespie, the subgroups of the event probability data group 46 including all the events in all subvolumes arranged in a predefined fixed order are treated as a single entity. Since the probabilities of all the events in all the subvolumes are summed to obtain the time step, treatment as a single entity allows a single time base to be established for the entire system. The value of each event probability may vary in each time-step caused by the changes of the system conditions in each subvolume, but the 'stacking order' of the event probabilities as defined by the event probability array 46 is maintained unchanged. Propagation of the system simulation can be more expeditiously performed by a simplified process wherein for each time step the simulating means 74 randomly selects one triggering event among the event probability data group 46 comprising all event probabilities. This is achievable for a spatially inhomogeneous system 60 comprising many subvolumes wherein each subvolume may have different event probabilities, material concentrations, reaction rates, temperatures, pressures, etc, because there is a relational-definition, i.e. subvolume INDX, which provides a link between each event probability to one or more subvolumes 62 and thence to a set of system characteristics as provided by the system state data group 42 and a set of material properties through the material property IDs.

Higher speed of system propagation is also achieved because, unlike the traditional stochastic simulators, the simulation means 74 in randomly selecting an event from the event probability data group 46 does not process the system propagation based on a general assumption that the selected event would cause the conditions with their associated event probabilities in all the subvolumes to change. Instead, the selected event is associated with a particular set of subvolumes identified by a set of subvolume INDXs and the simulating means 74 has sufficient information to determine if any additional subvolumes are affected by the selected triggering event. Updating of the system state data group 42 is only carried out for those limited number of subvolumes instead of the total system as is generally performed in the conventional simulator.

Figure 1:
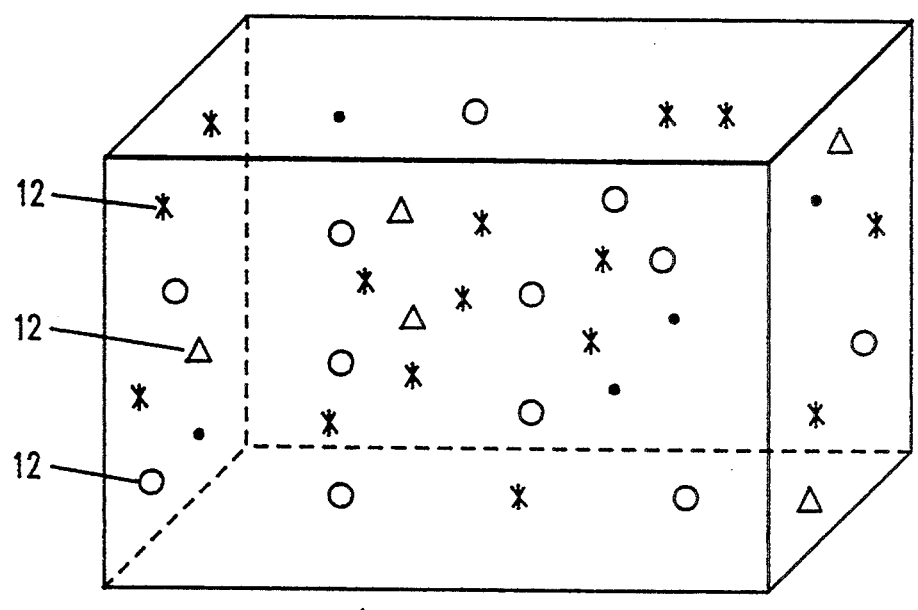
FIG. 1 is a perspective view of a homogeneous material-energy system containing a number of molecules of different species.
Figures 2A, 2B, 2C:
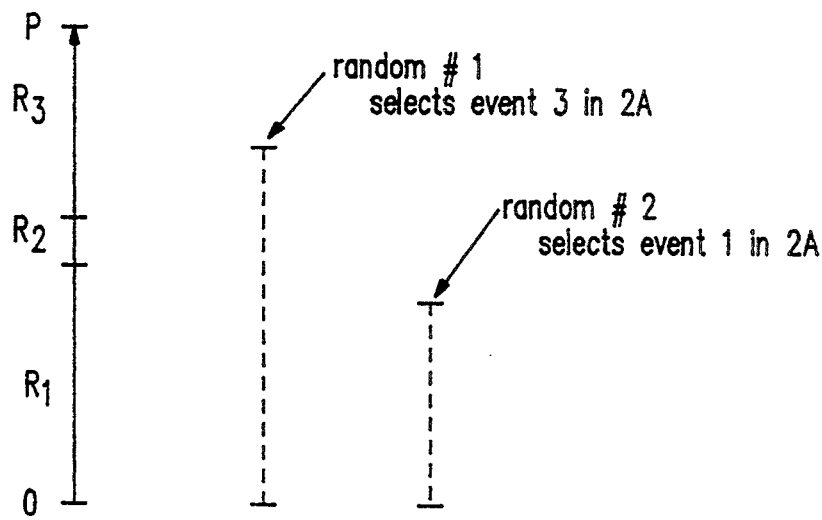
FIGS. 2A, 2B and 2C describe the event selection operation for a homogeneous chemical reaction wherein FIG. 2A lists reaction steps and rate laws, FIG. 2B lists probabilities and elapsed time calculations
Figure 6B:
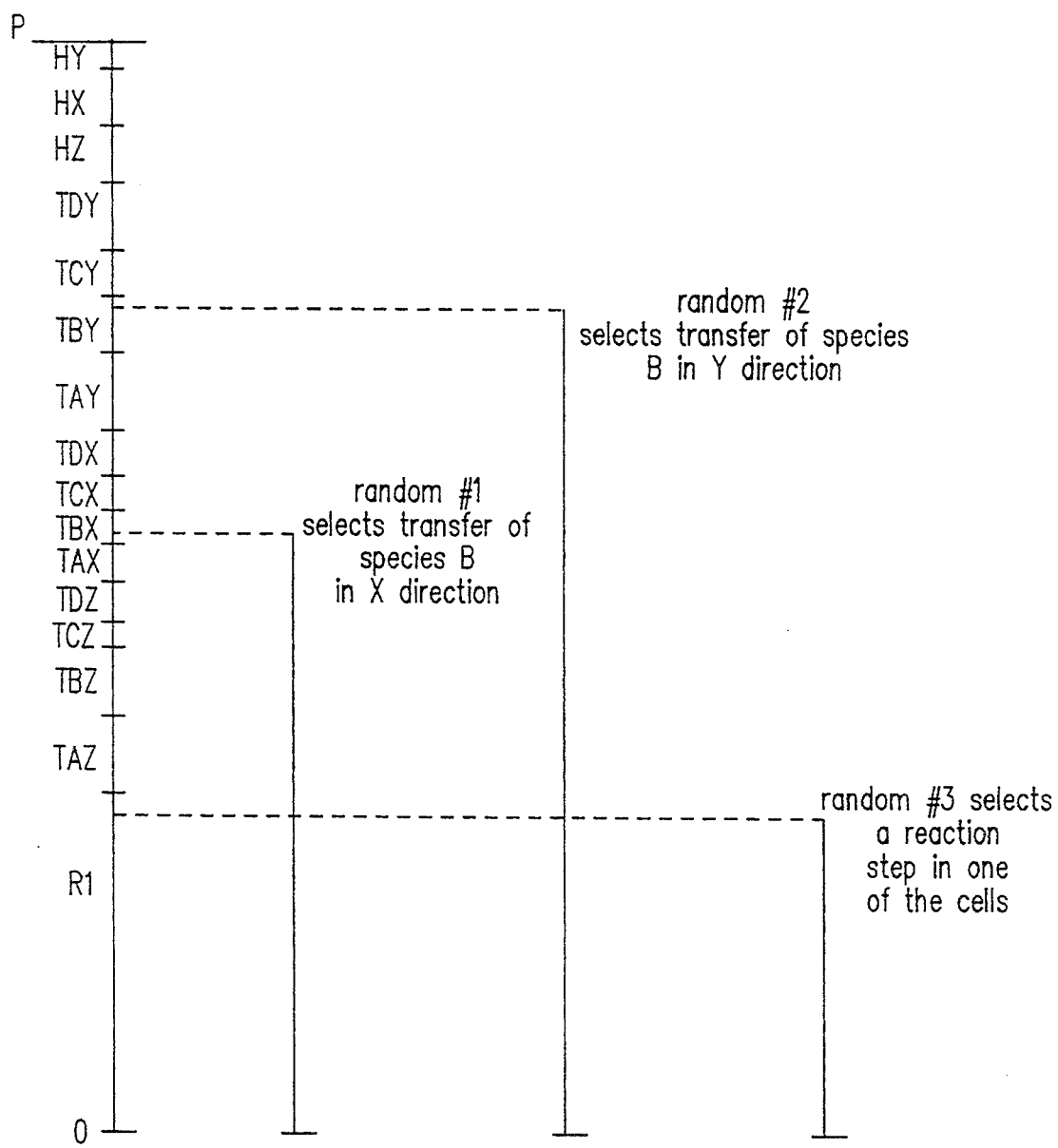
FIG. 6B is a schematic illustration of the event selection operation.
Figure 7:
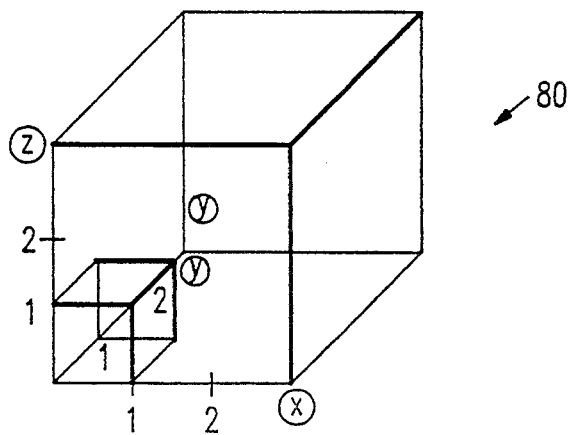
FIG. 7 shows a three-dimensional material-energy system divided into a $3 \times 3 \times 3$ array of cells wherein a table and conversion equations are included for illustrating the correspondence between cell pairs and probability array member, said correspondence being an example of how INDX may be used to link subvolumes to event probability subgroups.

One specific example that demonstrates these advantages is illustrated in FIGS. 6A, 6B and 7, where a system 80 (FIG. 7) simultaneously undergoing chemical reaction, mass transfer and heat flow. For simplicity of illustration, the system 80 undergoes the same three chemical reactions as that shown in FIG. 2 and also incorporates mass and heat transfer within a $3 \times 3 \times 3$ array of subvolumes (FIG. 7). The event probabilities for all possible processes in the system 80 are collected in the set of sixteen probability arrays shown in FIG. 6A. These arrays comprise:

1. the relative probabilities of each of the three chemical reactions occurring in a specific subvolume (3 reactions $\times$ 27 subvolumes for 81 terms),
2. the relative probabilities of mass transfer of any of the four chemical species (A..D) in the x, y or z directions across any of the 18 suvolume interfaces perpendicular to the direction ($4 \times 3 \times 18$ for 216 terms), and
3. the relative probabilities of heat transfer in the x, y or z directions across any of the 18 interfaces perpendicular to that direction ($3 \times 18$ for 54 terms).

The categorization of processes into independent probability arrays in this manner offers great flexibility in choosing which processes to include in a particular simulation. There is a direct correspondence which uses the subvolume INDX between a particular subvolume, or interface between a pair of subvolumes, and a specific member of each of the sixteen probability arrays. In FIG. 7 this correspondence is illustrated for the particular case of transport in the z direction across an interface between two subvolumes. For example, the value of z-transport probability array member $P_9$ would represent the probability for transport from the subvolume at position $x=2, y=2, z=1$ to the subvolume at position $x=2, y=2, z=2$. Taking (221) to be INDX for the source subvolume, and assuming $P_9$ is the probability of a selected event, INDX is determined from the number 9 using the correspondence equations given in the Figure. This particular correspondence would apply to the arrays TAZ, TBZ, TCZ, TDZ and HZ in FIG. 6A. Other correspondences would be established for other process probability data group members since different subvolumes or subvolume interfaces would be involved.

In the event selection process, rather than considering each probability array separately as would be done following Bunker et al. and Gillespie, all sixteen probability arrays are collected sequentially and the union of these arrays is considered as a whole. After calculating the total probability of these sixteen arrays, a time step is calculated from the total probability. A random number is generated and probability array elements are summed sequentially until a subtotal equal to or greater than the random number is found. The probability array element thus selected determines the event selected for the time step. This might be, for example, a member of the array TBY, corresponding to transfer of species B in the y-direction between two subvolumes. Depending on the value of the random number, any of the 351 elements of the sixteen probability arrays may be selected. The likelihood for selection of a given event is equal to its contribution to the total probability P. This is represented by the lengths of the line segments in FIG. 6B.

The flexibility and the modular organization provided by the simulating means 74 and the data structure 40 enable the software/hardware system 70 to be implemented in a wide variety of processors and data storage configurations. Taking advantage of the more expeditious simulation propagation process and the high speed processor systems with increased data storage capacity, the real-time control of an on-line system 60 as that shown in FIG. 5 is achievable. A preferred embodiment is described below as an example of such implementation.

Figure 8A:
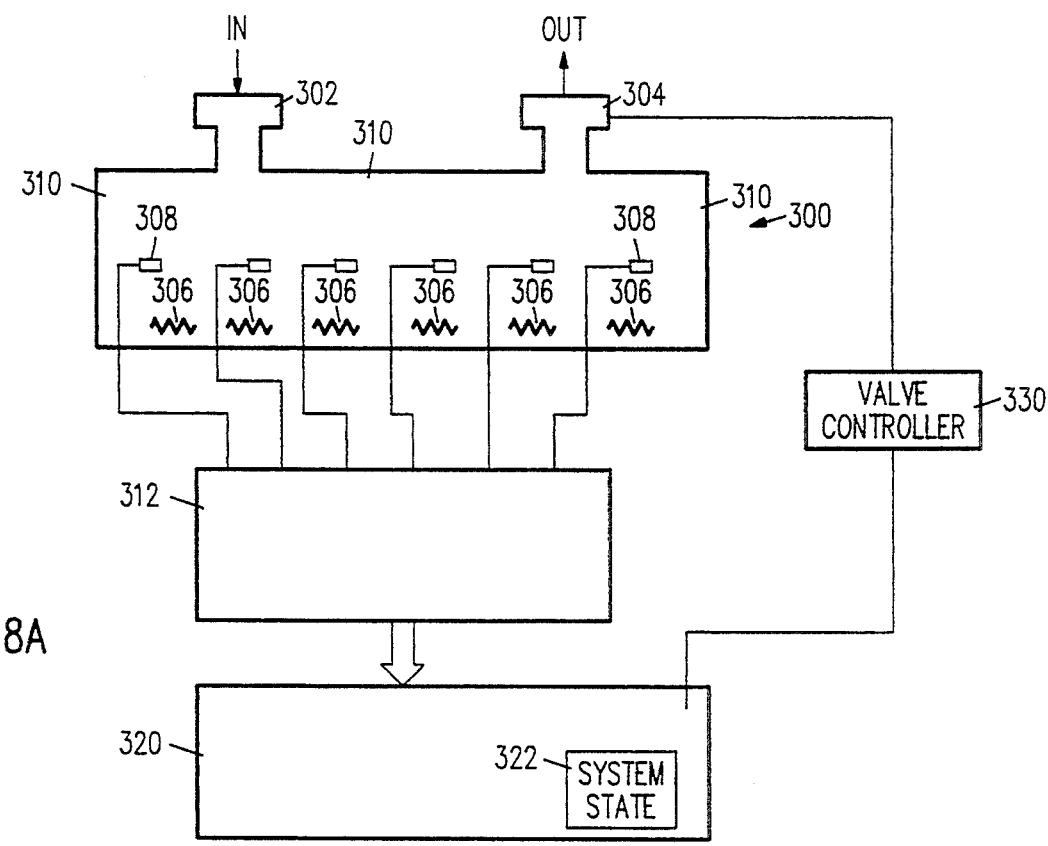
FIG. 8A shows a chemical reactor controlled by a simulator system.

FIG. 8A shows a chemical reactor 300 comprising an inlet valve 302 for filling the reactor with a plurality of reagents, an outlet valve 304 for draining the reactor 300 after the consumption of the reagents reaches a predefined percentage, e.g. ninety-two percent, and a plurality of heaters 306 disposed on the bottom of the chemical reactor for heating the reagents contained therein. The reaction rates and the consumption of the reagents are dependent on the temperature distribution in the reactor 300. The optimal level of reagent consumption, i.e. ninety-two percent, is to prevent excessive by-products from being produced. There are six temperature sensors 308 monitoring the temperature distribution of six subvolumes 310 of the reactor 300.

The temperature measurements from these six sensors 308 are converted as digital signals by an analog to digital converter 312 which are then received by an on-line process control simulator 320 as the temperature input. The simulator 320 receives the temperature signals as the initial condition before the simulation and periodically during the on-line control process to periodically update a system state data group 322. The simulator also performs the simulation steps as described in Appendix A to predict the percentage of reagent consumption as a function of time. The simulator also predicts the time when the predefined optimal level of consumption is completed. An output signal is generated before the optimal level consumption is reached to a chemical reactor controller 330 which automatically opens the outlet valve 304 at the predicted time to drain the products generated in the chemical reactor 300 and to initiate a refilling process to start the chemical reactor 300 again.

The use of a more complicated design of temperature control may be avoided while an optimal reaction completion level is maintained by use of the on-line simulator 320. A more flexible operation is also allowed because the chemical reactor can accommodate a wider range of initial temperatures of the reagents when the temperature distribution is monitored and controlled by the simulator 320 and the controller 330.

Figure 8B:
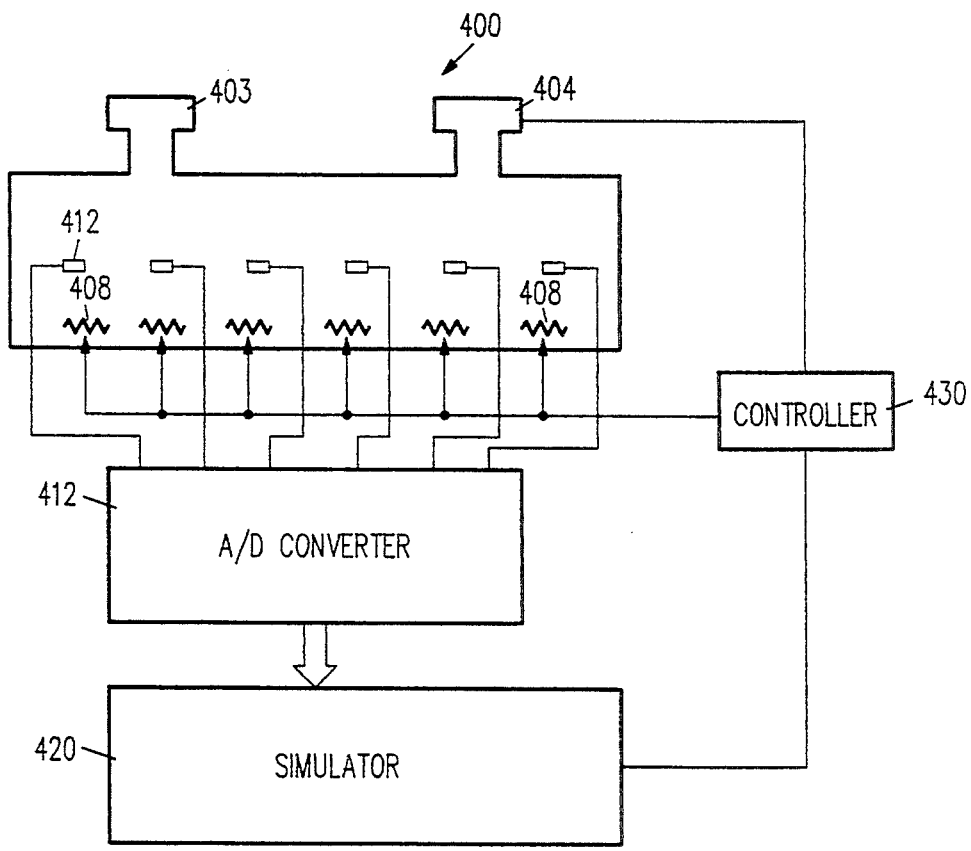
FIG. 8B shows another chemical reactor controlled by a simulator controller to achieve a predefined reaction rate.

FIG. 8B shows another chemical reactor system 400 comprising a chemical reactor, a simulator and a reactor controller similar to the chemical reactor system 300 as shown in FIG. 8A. The chemical reactor system 400 differs from the reactor system 300 in that the reactor system 400 the heaters 408 are controlled by the simulator 420 and the reactor controller 430 to achieve a certain reaction rate. After receiving the temperature signals from the temperature sensors 412, the simulator 420 not only updates the system state data group, it also predicts a temperature profile to achieve a specific reaction rate based on the existing temperature distribution. The predicted temperature profile is transmitted to the reactor controller to adjust the heaters 408 whereby the reaction rate and the production time of the chemical reactor 400 can be actively controlled. By adding the heater control mechanism to the reactor controller, a more precise control of the production time is achieved.

Figure 9:
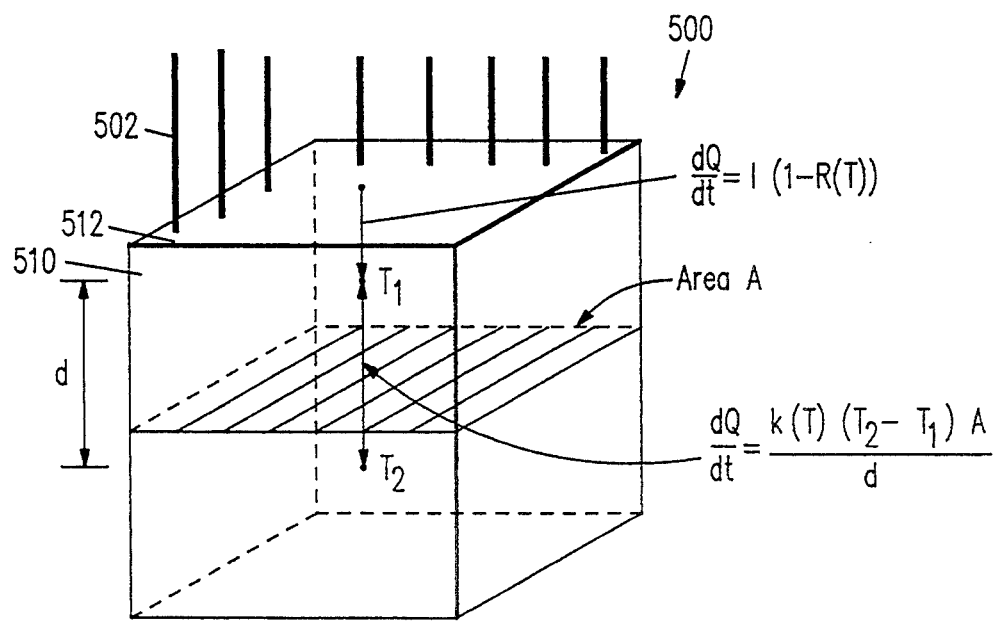
FIG. 9 shows a material energy system receiving energy input from a laser beam.

FIG. 9 shows a material-energy system 500 wherein a laser beam 502 is irradiated on the top surface of the system 500 which generates an energy input, i.e. rate of heat, Q, flow into the system. The heat flow Q is a function of the temperature-dependent optical properties of the cell onto which the laser beam 502 is incident. The power of the incident laser beam 502 is represented by I and the temperature-dependent reflectivity is represented by R(T) where T is the temperature. The rate of heat transfer to an adjacent cell depends on the temperature-dependent thermal conductivity K(T), the temperature difference between the first and second subvolumes, the contact area A between the subvolumes and the distance between their centers, d. The instantaneous heat content Q of a subvolume determines its temperature according to the relation $T = Q/C_p M$, where $C_p$ is the heat capacity and M is the number of moles of material in the subvolume.

Figure 10:
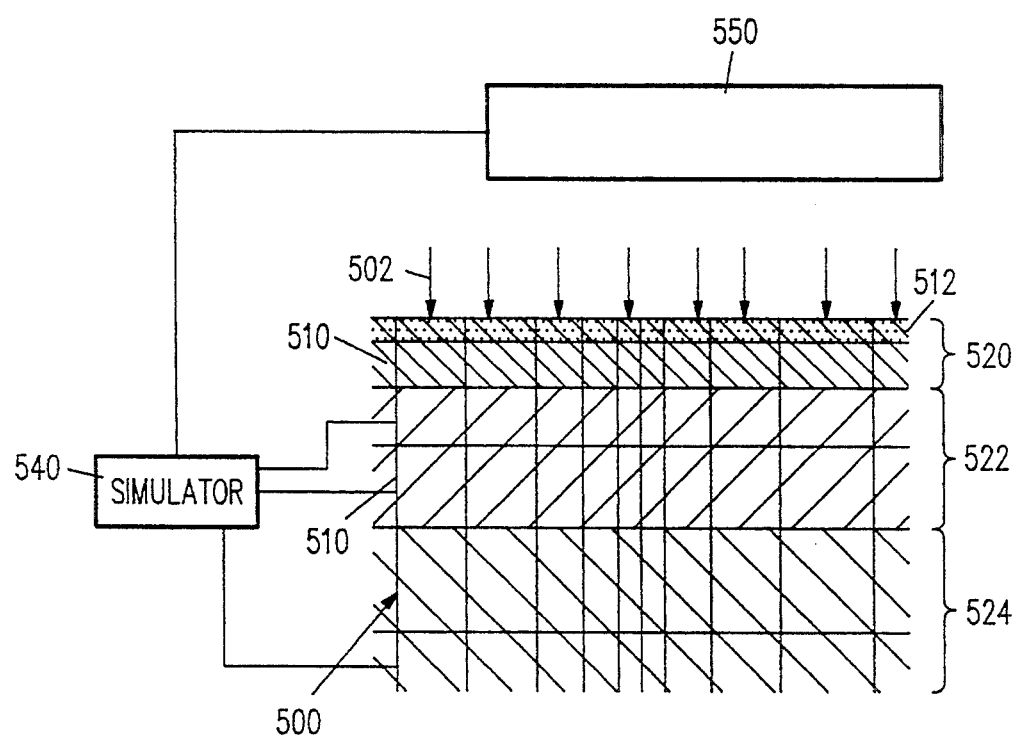
FIG. 10 shows the material energy system of FIG. 9 controlled by a on-line simulator according to the present invention.

FIG. 10 shows the material-energy system 500 which is divided into a plurality of subvolumes 510. The subvolumes 510 are cylindrically symmetric to allow two-dimensional coordinates to be used. The system 500 comprises three different layers of materials, i.e. layer 520, layer 522 and layer 524 which may in turn comprise one or more slices where the thickness of a slice is the thickness of the subvolume. All light is absorbed in the top slice 512. The rate of energy variations in the subvolumes near center of the top slice 512 is expected to be greater than the subvolumes 510 which are remote from the laser beam 502 which is the heat source. The material property data group provides information for R(T) which is the temperature-dependent reflectivity of the lop slice 512 while the thermal conductivity K(T), density $\rho$, and heat capacity $C_p$ are provided for each of the three layers 520, 522 and 524. The simulator predicts the temperature distribution as a function of time. The material-energy system 500 can be a thin film comprising three layers of materials deposited on a substrate (not shown) whereupon a laser beam 502 is applied to the top slice 512. By the use of a simulator 540, a laser source 550 which generates the laser beam 502 can be controlled to produce a predefined temperature profile in the three layers 520, 522 and 524 of in the thin-film system 500.

Figure 11:
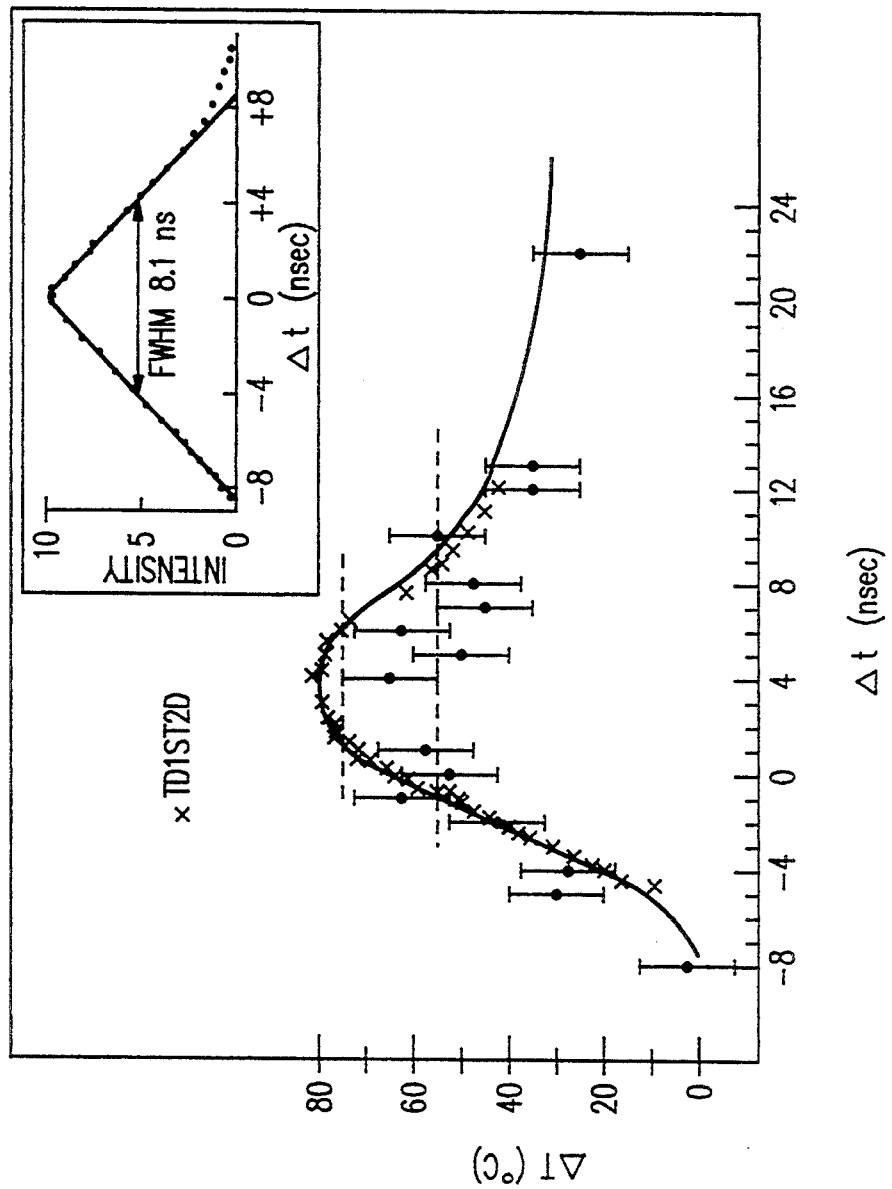
FIG. 11 is a comparison of a time-dependent temperature calculation made with a preferred embodiment of this invention to a conventional calculation.
Figure 12:
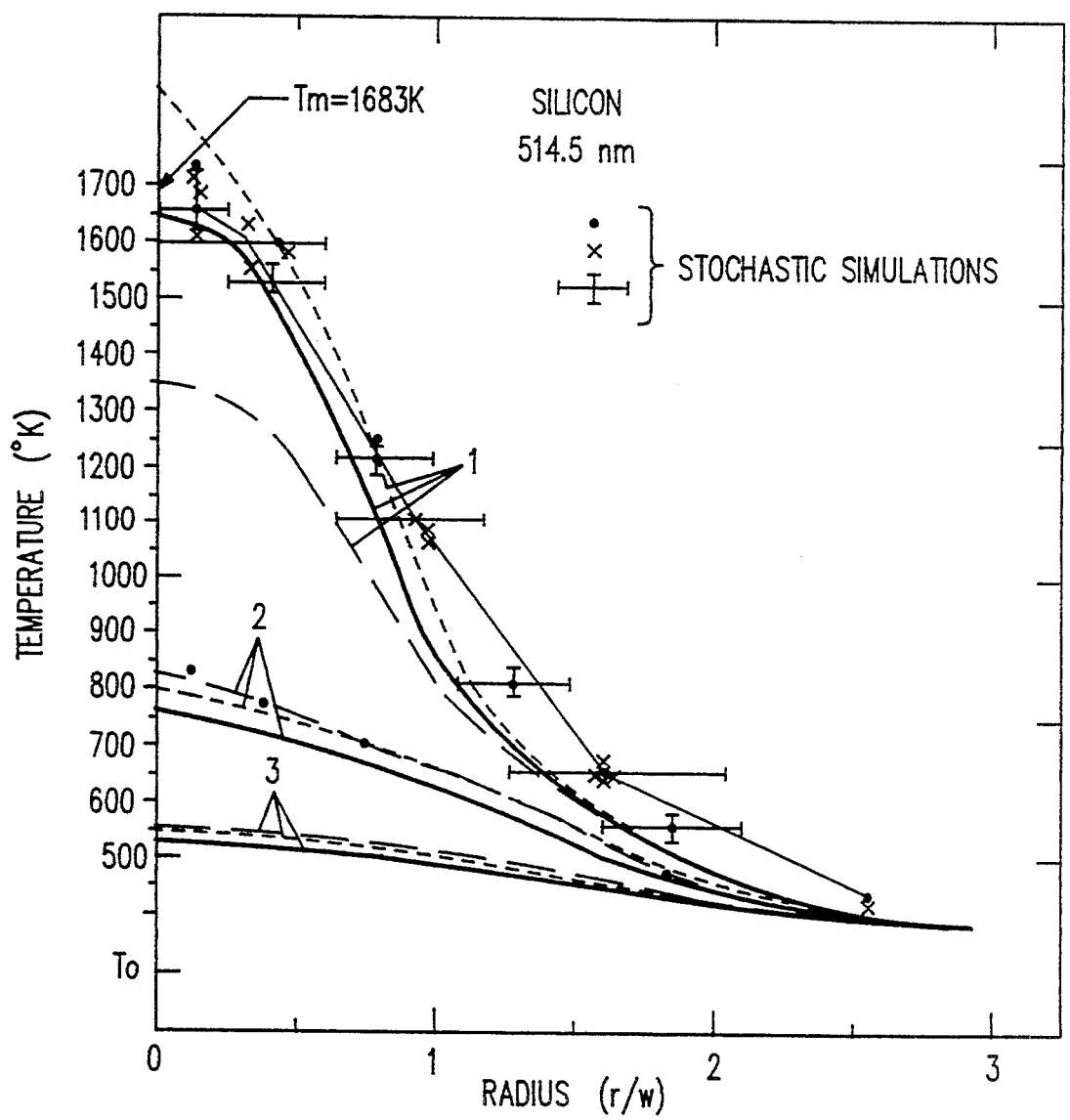
FIG. 12 is a comparison of a spatial temperature distribution calculated with a preferred embodiment of this invention to a conventional calculation.
Figure 13:
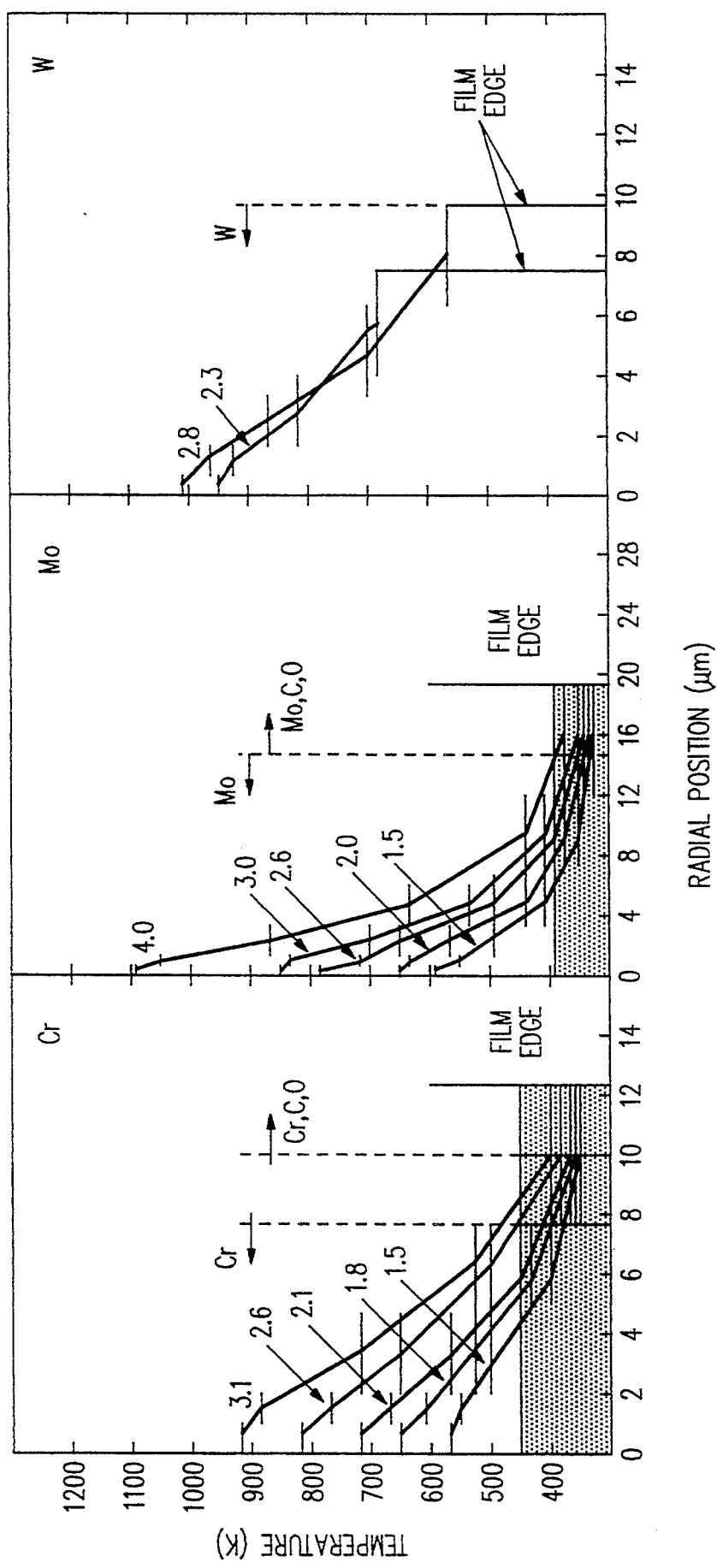
FIG. 13 is an example of spatial temperature distributions calculated for 2-layer systems using a preferred embodiment of this invention.

By examining the simulation results as that shown in FIGS. 11, 12 and 13, the temperature profile in the system 500 can be accurately controlled according to the preferred embodiment as that shown in FIG. 10. FIG. 11 is a comparison of the results of a temperature calculation performed with simulator 540 to the results obtained by an analytic solution to the heat-diffusion equation for pulsed infrared laser heating of silver. The analytical solution is disclosed in a publication by J. M. Hicks, et al., Physical Review Letters, Vol. 61, No. 22, pp. 2588–2591, 1988. The materials and beam parameters used in simulator 540 are the same as those used in the analytical solution. The results plotted are the time-dependent temperatures of the center subvolume of the top slice 512, onto which the laser beam 502 is entirely incident and absorbed. Its radius is 0.9 mm and its thickness is 27 nm.

FIG. 12 is a comparison of results of temperature as predicted by simulator 540 to an analytic solution for cw visible laser heating of silicon. The analytical solution is disclosed in a publication by E. Lariokapis et al., Journal of Applied Physics, Vol. 57, No. 12, pp. 5123–4126, 1985. Both solutions utilize the temperature dependent thermal and optical properties of silicon, and the temperature distributions at the top slice 512, i.e. the silicon surface, are compared. Results for several spatial geometries for the stochastic simulation are shown.

FIG. 13 shows the results of the temperature distribution predictions for cw laser heating of 2 $\mu m$ thick, 25-50 $\mu m$ diameter films of Cr, Mo and W on large silicon wafers. Results for the top slice 512 of each metal at the various laser powers (in MW/cm$^2$) are shown. The dashed vertical lines delineating regions of pure metal and metal contaminated by carbon and oxygen are for comparison to experimental data, and serve to determine a minimum temperature for obtaining clean metal films in laser chemical vapor deposition from the Cr, Mo and W hexacarbonyls. The optical properties of the metals were assumed to be temperature-independent, all thermal properties for the metals and the silicon substrates were temperature dependent.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A simulator system for simulating a time-progressive non-homogeneous material-energy system which is subdivided into subvolumes for the simulation, the simulator system comprising:

i) a data storage system;

ii) a system state data group, stored in the data storage system, including definitions, configuration information, material composition information, and system condition information for each of the subvolumes, each of the definitions including a respective subvolume index;

iii) a material property data group, stored in the data storage system, including a plurality of data subgroups, each of the subgroups having associated therewith a material property ID specifying a material contained within at least one of the subvolumes, each of the subgroups including physical and chemical information describing respective materials and chemical species present in the material-energy system, each subgroup also containing definitions of properties of the specified material;

the material composition information in the system state data group including the material properly IDs, for linking between a given one of the subvolumes and the data subgroups of the material property data group, based on a material composition of the given subvolume;

the simulator system further comprising:

iv) an event probability data group, stored in the data storage system, including event probability subgroups of respective events, each event probability subgroup including an event number for identifying the event, each event being associated with at least one of the subvolumes and having an event probability depending on the system condition and the material properties of the materials in the associated subvolumes;

each event probability subgroup being assigned to ones of the subvolumes for which the respective events may take place, by including the subvolume index within the event probability subgroup, for linking the event probability subgroups to the associated subvolumes, the event probability subgroups being arranged in a array such that, from a predetermined arithmetic expression, an array index may be calculated from a subvolume index to determine an event probability subgroup assigned to a subvolume;

and the simulator system further comprising:

v) an event process data group, stored in the data storage system, including a plurality of process functions for determining the event probabilities from the system condition information included in the system state data group, each process function having associated therewith a subvolume index corresponding with a subvolume within which an event, for which the process function is used to determine the event probability, is to take place;

wherein a linking relationship between the data groups is provided by the subvolume indices and the material property IDs to facilitate operation of the simulation system.

* * * * *

UNITED STATES PATENT AND TRADEMARK OFFICE
CERTIFICATE OF CORRECTION

PATENT NO. : 5,446,870
DATED : Aug. 29, 1995
INVENTOR(S) : William D. Hinsberg, III; Frances A. Houle It is certified that error appears in the above-indentified patent and that said Letters Patent is hereby corrected as shown below:

On the title page item [56], line 13, change spelling of attorney name from "Pinter" to --Pintner--.

Column 15, line 30 (Claim 1, line 24), change "properly" to --property--.

Column 16, line 16 (Claim 1, line 45), change "a array" to --an array--.

Signed and Sealed this

Fifth Day of March, 1996

Attest:

BRUCE LEHMAN

Attesting Officer

Commissioner of Patents and Trademarks